3,161,373
AUTOMATIC ALIGNMENT MECHANISM FOR
COMPOSITE AIRCRAFT
Richard Vogt, Hamburg, Germany
(R.R. 1, New Carlisle, Ohio)
Filed Jan. 24, 1949, Ser. No. 72,467
17 Claims. (Cl. 244—2)
(Granted under Title 35, U.S. Code (1952), sec. 266)

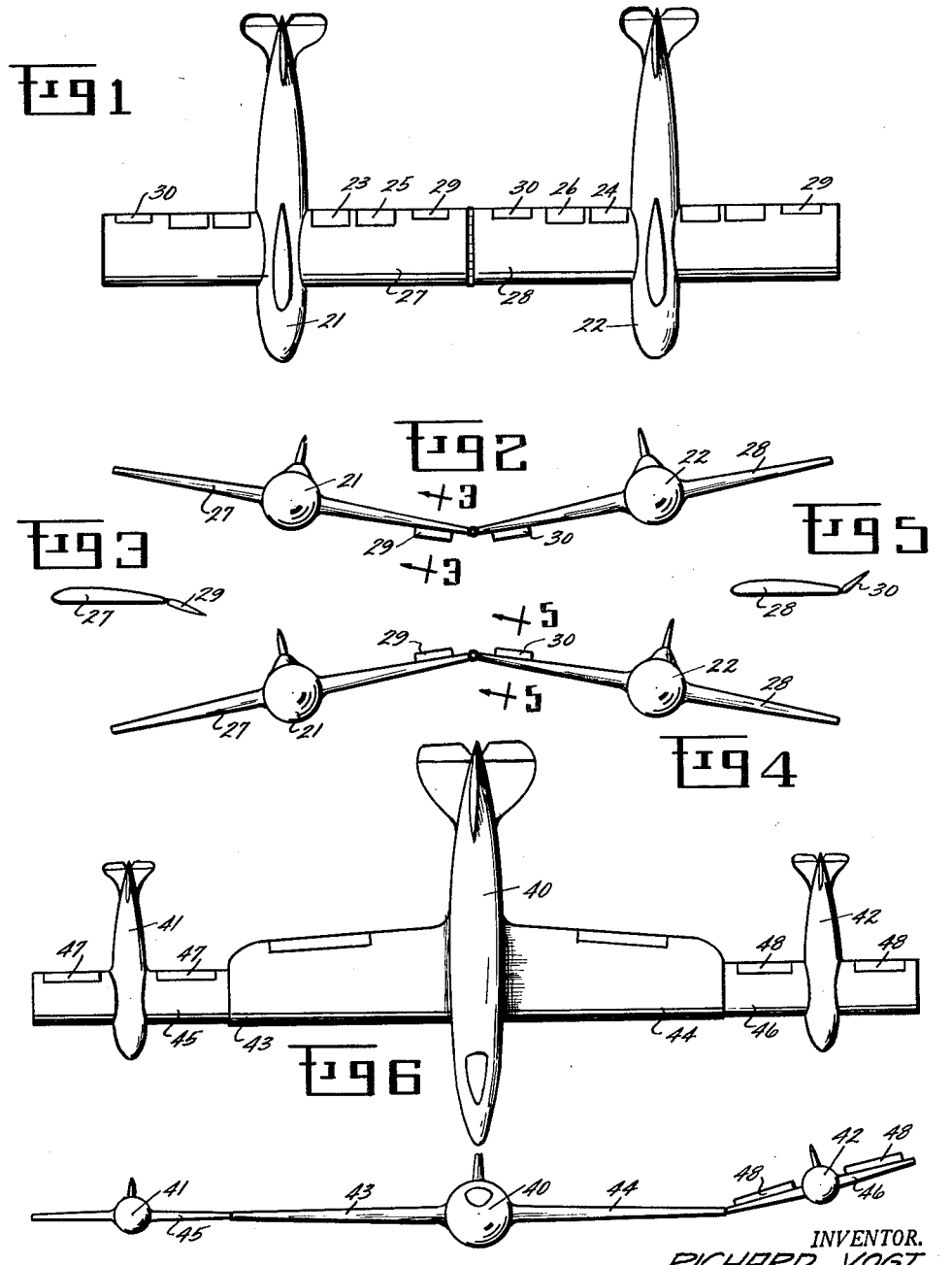

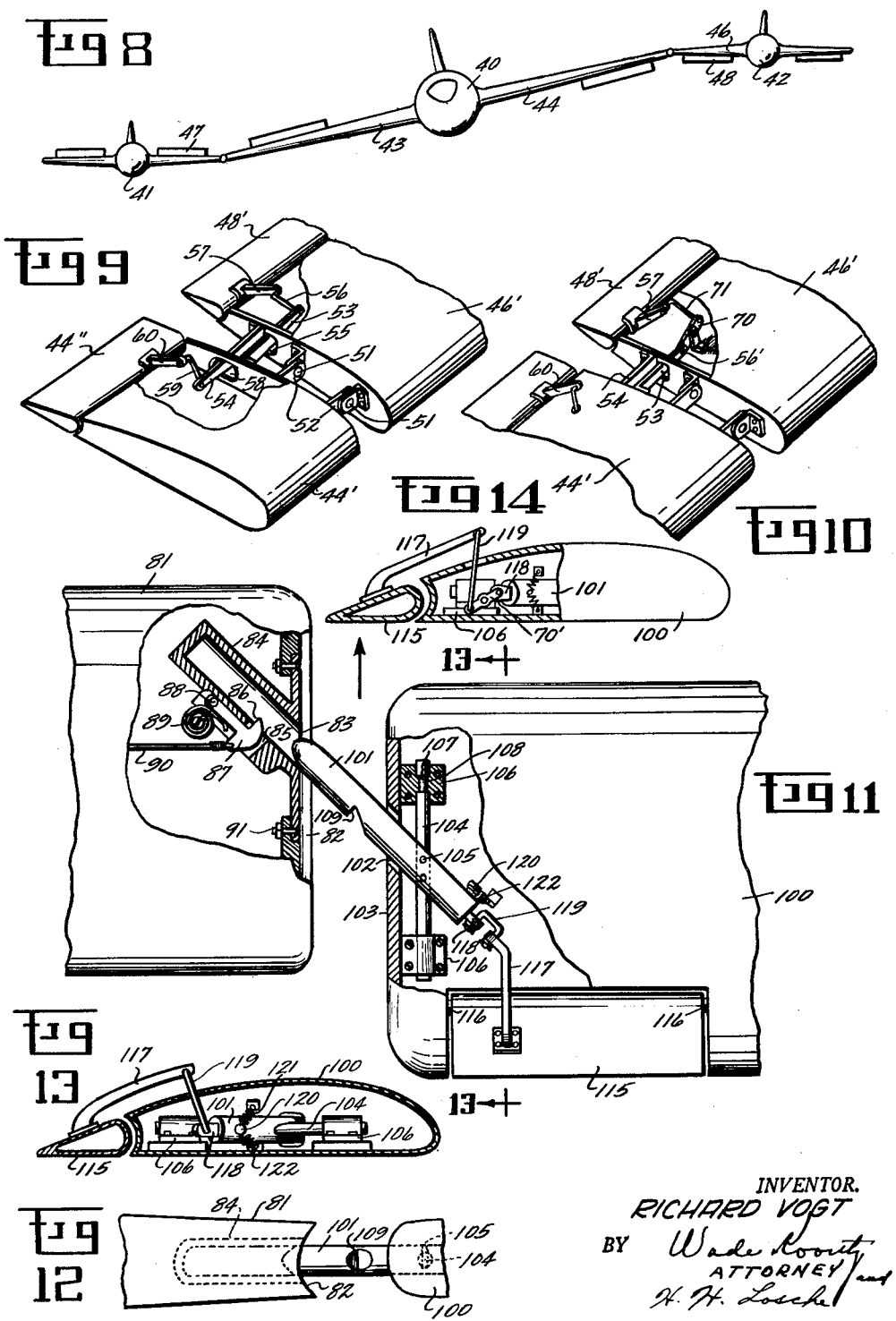

The invention described herein may be manufactured and used by or for the United States Government for governmental purposes without payment to me of any royalty thereon.

This invention relates to heavier than air craft and more particularly to hingedly connecting a plurality of winged aircraft components in spanwise relation to increase the lift-to-drag ratio without increasing wing structural weight such that the aircraft components may be coupled or uncoupled in flight and have flaps for automatically controlling the aircraft wing alignment during coupled flight.

The maximum load and range of an airplane are governed principally by the gross weight of the airplane and the aerodynamic drag which determines the power required. It is essential therefore that the overall lift to drag ratio ($L/D$) be high within the portion of the speed range of the airplane most concerned. Reduction in structural weight and hence an increase in useful load to be carried is possible only to a limited extent. The overall drag of the airplane may be reduced to a small extent by improved streamlining and choice of aerodynamic wing sections. The drag of the wing may be divided into profile drag, that due to the character of the wing section employed and induced drag, the drag due to the planform dimensions of the wing generally expressed as the ratio of the span to the mean chord or the aspect ratio. The coefficient of induced drag varies inversely as the aspect ratio and directly as the square of the lift coefficient. For aircraft required to fly at high lift coefficients, i.e. large heavily loaded aircraft and those required to fly at very high altitudes, a high aspect ratio wing is essential. When, however, it is attempted to increase aspect ratio the structural weight of the wing increases because of the increase in bending moments which increase as the square of the semi-span and the wing weight increases approximately as the 1.5 power of the increase in aspect ratio. With a given airplane the rapid increase in structural weight soon offsets any improvement in drag reduction due to increase of aspect ratio so that in modern aircraft an aspect ratio limit of eight is usual with a few airplanes having an aspect ratio of ten. The present invention relates to means whereby it is possible to increase the aspect ratio of the wings of airplanes without incurring prohibitive increases in wing structural weight.

In accordance with the present invention, the span can be increased to increase the $L/D$ ratio without any sacrifice in weight by the wing span being made up of hingedly joined wing sections such that substantially no bending forces will be transferred from one to the other and each wing section bears its own load. Such wing spans may be provided in various combinations as by hingedly connecting floating wings to the wing tips of airplanes with gasoline container means or other loads therein and which can be dropped when desirable, or as by hingedly connecting guided missiles, gliders, or other aircraft components in spanwise relation. Where the invention is applied to the combination of airplanes by hingedly joining their wing tips, this connection may be of a construction to enable the pilots to disjoin and reconnect in flight. The invention further contemplates making the normal wings of an airplane in pivotally related sections so that each wing section requires a corresponding lighter structure. Actual studies have shown that for long range airplanes practicing this invention the pay load can easily be increased by about 100 percent, or with unchanged load a corresponding range increase can be achieved.

The invention also includes automatic means for controlling the alignment of the floating wing sections with the companion wings which comprise trailing edge wing flaps that steer the wing sections in the proper direction to maintain proper wing angular position to compensate for changes in load or air currents.

It is a primary object of this invention to provide a means of increasing the $L/D$ ratio of the wing area of aircraft without increasing the structural wing weight.

It is also a fundamental object of this invention to provide an aircraft of high aspect ratio with a low proportionate wing weight by constructing the wing in hinged sections each wing section being capable of carrying its own load.

It is another object of this invention to provide a wing span that is divided into sections pivotally connected substantially normal to the direction of span in which each wing section is capable of carrying its own load and has trailing edge flaps operable in combination with the adjoining wing section to maintain the separate wing sections in floating alignment for changes in air flow and for proper relative floating wing angles in response to changes in load.

It is still another object of this invention to provide means of pivotally connecting gliders, aircraft, airfoil extensions, or parasite aircraft to a mother aircraft, powered or unpowered, in wing spanwise relation wherein each glider, aircraft, airfoil extension, or parasite aircraft is self-supporting in the airstream for itself and its load and the aspect ratio is increased for the composite aircraft without increasing the weight for the mother aircraft.

It is a further object of this invention to provide an aircraft with articulated wing structure in which the wing area of each individual wing component between joints is sufficient to support its own intended load, whether the load is fuel, engines, missiles, cargo, or just a wing extension, the wing component joints each forming pivots along an axis substantially perpendicular to the longitudinal center line of the wing span and being disconnectible, and trailing edge flaps on each wing component such that the flaps of one wing component are associated with the adjacent wing component in a manner to control the flaps to effect substantial wing alignment wherein the composite aircraft wing structure is of relative high aspect ratio and low proportionate wing weight capable of carrying a greater disposable load and increasing the composite aircraft range.

It is still a further object of this invention to provide disconnectible pivotal means for hingedly connecting the wing tips of winged aircraft components together by a shaft element angularly disposed forwardly and outwardly of the wing tip of one aircraft component operable to fit into a cylindrical forwardly and inwardly disposed socket in the wing tip of a companion aircraft component, the shaft being pivotally mounted in the respective wing tip on an axis substantially paralleling the longitudinal center line of the aircraft, and trailing edge wing flaps on at least one of the connected wings controlled by the companion wing in accordance with the angular relation of the connected wings to aerodynamically maintain substantial wing alignment, the shaft being latchable in the socket to maintain the wing tips in a hinge connected relation such that two or more aircraft components may be flown as a composite unit and capable of disconnection and reconnection in flight.

These and other objects and advantages will become more apparent to those skilled in the art as the description proceeds when taken in view of the accompanying drawings, in which;

FIG. 1 is a top plan view of two airplanes hinged at their wing tips in spanwise relation in accordance with the invention;

FIG. 2 is a front elevational view of the airplanes in FIG. 1 showing them with an upward dihedral angle;

FIG. 3 is a cross-sectional view of the wing tip and flap of one of the airplanes taken on the line 3—3 of FIG. 2;

FIG. 4 is a front elevational view of the airplanes in FIG. 1 showing them with a negative dihedral angle;

FIG. 5 is a cross section of the wing tip taken on the line 5—5 of FIG. 4;

FIG. 6 is a top plan view of a mother large and two small aircraft components hingedly connected in spanwise relation in accordance with the invention;

FIG. 7 is a front elevational view of the composite aircraft of FIG. 6 showing the right aircraft component deflected upwardly;

FIG. 8 is another front elevational view of the composite aircraft shown in FIG. 7 performing a turn;

FIG. 9 is an isometric view of the wing tip hinged portion of the pivotally joined aircraft components shown in FIGS. 6, 7 and 8;

FIG. 10 is an isometric view of the hinged portion of the wing tips as provided for composite aircraft illustrated in FIGS. 1, 2 and 4;

FIG. 11 is a plan view partly broken away of wing tips of aircraft components showing structure for permitting connection and disconnection during flight;

FIG. 12 is an end elevational view of the wing tips as seen from the rear of FIG. 11;

FIG. 13 is a partly sectional view with some parts shown in elevation taken on the line 13—13 of FIG. 11; and FIG. 14 is a view similar to FIG. 13 illustrating a means for reversing the direction of flap actuation from that shown in FIG. 13.

Referring to FIGS. 1 to 5, there are shown two airplanes 21 and 22 having the usual flaps 23 and 24, respectively, and ailerons 25 and 26, respectively, on their wings 27 and 28. In addition, these airplanes have trailing edge flaps 29 and 30, respectively, that operate automatically to maintain the wings 27 and 28 in aligned spanwise relation in flight, the mechanical structure of which will later be described. As best seen in FIG. 2, the flaps 29 and 30 will both be deflected downward in proportion to the dehedral angle of displacement that the two airplanes might assume by reason of wind gusts, or the like. FIG. 3 shows this theoretical deflection of the trailing edge flap 29 of the wing 27. The downward deflection of the flaps 29 and 30 increase the lift at the inner wing tips to elevate the hinge connection and bring the wings 27 and 28 back into alignment. Likewise, any upward movement of the inner wing tips at the hinged connection tending to place the airplanes in a condition with a negative dihedral angle, as shown in FIG. 4, causes the flaps 29 and 30 to be deflected upwardly to lower the hinged connection and restore the wings back into alignment. The upward deflection of the flaps 29 and 30, upon the airplanes assuming the formation shown in FIG. 4, is illustrated in FIG. 5.

The two airplanes hingedly connected in this manner practically doubles the L/D ratio without any increase of wing weight. In this manner the load of the two airplanes may be increased or they may be flown a greater distance.

The teaching of this invention may be exercised in many ways. As shown in FIGS. 6, 7 and 8, a mother aircraft component 40 may have smaller aircraft components 41 and 42 hingedly connected to each wing tip 43, 44 thereof by the wing tips 45 and 46, respectively, of the smaller aircraft components. Each of the small aircraft components 41 and 42 has trailing edge flaps 47 and 48, respectively, that are mechanically related to the wing tips 43 and 44, respectively, of the mother aircraft component 40 to operate in accordance with the relative dihedral angle of the wings. Any force producing misalignment of the wings will deflect the flaps 47 and 48 in a direction to bring the wings back into alignment. This may best be understood by referring to FIG. 7 in which it is seen that the smaller aircraft component on the right has been deflected upwardly by reason of a gust of air, or the like, and the flaps 48 have been deflected upwardly to produce a downward push to re-align the wings thereof with the wings of the mother aircraft component 40. This arrangement is preferred to that employed with only two connected aircraft where the hinged joint is lifted since a minimum vertical reaction will be transferred to the main wing at the hinge joint. Where the mother aircraft component 40 is a powered airplane, the small aircraft components will always attempt to maintain wing alignment by operation of the wing flaps 47 and 48. When the mother aircraft 40 is maneuvered for turns, as shown in FIG. 8, the smaller aircraft components 41 and 42 will tend to assume the position shown in this illustration, exaggerated somewhat for clearness of operation, but the flaps 47 and 48 immediately come into operation to maintain wing alignment. In actual practice, there will be no noticeable wing misalignment unless the maneuvering is very rapid or the air is rough.

The composite aircraft shown in FIGS. 6, 7 and 8 may be made up of various combinations of aircraft components. For example, the mother aircraft component 40 may be a large multimotor airplane and the smaller aircraft components may be small powered airplanes, gliders, guided missiles, fuel tanks, or the like. While these figures illustrate a large mother and two small aircraft components, it is to be understood that the three may be of substantially the same size further carrying out the inventive concept set out in FIGS. 1 to 5. The mother or central aircraft component may be a glider carried by the two small powered aircraft components. It is also within the scope of this invention to power the composite aircraft of FIGS. 6, 7 and 8 by placing power plants in the wings 43, 44, the fuselage being eliminated, and controlling the composite aircraft by the smaller aircraft components. In all these different combinations, the L/D ratio, or aerodynamical fineness, is increased which is the object of aircraft designers to produce aircraft capable of carrying heavier loads or having greater range.

The manner in which the wings may be hingedly connected such that the trailing edge flaps are controlled automatically in accordance with the dihedral angular variation of the wings is shown in FIG. 9. In some constructions, as in FIGS. 6, 7 and 8, it is essential that the flaps turn downwardly when the wings assume a negative dihedral angle and the flaps turn upwardly when the wings assume a positive dihedral angle in order to avoid a large vertical reaction at the hinge joint as previously explained. This is accomplished by the two wing tips such as 44' and 46' each having trailing edge flaps 44'' and 48', respectively, that are hinged by hinge pins 51 through hinge members 52 secured to the tips of the wing structure. Each wing tip has a bracket 53, 54 secured respectively thereto which extends into the companion wing tip. That is, the bracket 53 of the wing tip 44' extends through an opening 55 in the wing tip 46' the free end of which is connected by a rod 56 passing through the skin of the wing and connecting the free end of a flap actuating horn 57. Likewise, the bracket 54 secured to the tip of the wing 46' passes through an opening 58 in the tip of the wing 44' and has the free end thereof coupled to a rod 59 that extends through the skin of the wing 44' and connects the trailing edge flap 44'' actuating horn 60. This hinged portion may be inclosed by wing tip continuations in any well known manner to provide smoother air flow over the hinge joint.

In the operation of this hinged joint and flap construction, it may be seen that when the wings are pivoted to assume a positive dihedral angle, the bracket 53 will pull the rod 56 down deflecting the wing flap 48' upwardly. The bracket 54 will also pull the rod 59 causing the flap 44" to be deflected upwardly. FIG. 9 shows the means for controlling the trailing edge flap on each wing although it may be desirable and suitable to have a trailing edge flap on the tip of only one wing or one aircraft component as shown in FIGS. 6, 7 and 8. A positive dihedral angle of the wings and flap deflection just described is shown in FIG. 7 and by the left half of the composite aircraft shown in FIG. 8. A negative dihedral angle of the wings will reverse the flap deflection, as shown by the right portion of the composite aircraft illustrated in FIG. 8.

For trailing edge flap operation to control wing alignment of composite aircraft connected as illustrated in FIGS. 1 to 5, flap control must be modified somewhat in order that positive dihedral angles of the wings cause downward deflection of the flaps and negative dihedral angles cause upward deflection of the flaps. In order to accomplish this, the hinge and flap control construction shown in FIG. 9 may be modified in the manner shown in FIG. 10. The free end of the bracket 53 is connected by a pin 56' to one end of a centrally pivoted lever 70 which has its other end connected by a rod 71 through the skin of the wing to the flap actuating horn 57. A similar connection is made between the bracket 54 and the horn 60. This construction provides upward deflection of the control flaps upon negative dihedral angle conditions, and vice versa.

The axis of the hinge is shown in the various views as being parallel to the longitudinal center line of the aircraft components although the angle of the hinge axis may be slightly convergent or divergent with respect to the aircraft longitudinal center line to provide positive or negative lift on the aircraft components as a result of angular deviations from the aligned position of the wings. Such angulations of the hinge axis for known floating wing structures are familiar to those skilled in the art and will not be described further since that feature does not form a part of this invention.

It will appear evident from the above description that the hinged construction is somewhat permanent in nature. There are indications, however, that there is a growing interest in coupling and uncoupling aircraft components during flight. While this sounds very difficult and impractical, pilots relate that it is very easy to touch wing tips or hold them in close range during flight, even with the high speed planes known generally today as "jets." It would be very beneficial in some aspects of aviation to pivotally connect and disconnect aircraft components in flight for the purpose of carrying greater loads or to increase the aircraft range. For example, the composite aircraft shown in FIGS. 6 to 8 may be a bomber and two fighters. As the bomber approached its target and needed fighter escort, the fighters could be released, the bombing mission performed and the fighters reunited with the bomber with the advantage of increasing the bomber's range and enable the fighters to give protection throughout the whole flight of the bombing mission with the additional advantage that the fighters travel free while connected to the mother bomber. Fighter planes, as shown in FIGS. 1 to 5, could be coupled and uncoupled in flight to increase their range or gas load, or both, by the proper load addition.

FIGS. 11, 12 and 13 illustrate one structural manner of providing hinged joining of aircraft components during flight as desired wherein the structure is capable of automatically keeping the wings in alignment during flight while the aircraft components are in their connected relation. It is within the scope of the contemplated invention that corresponding wing tips of aircraft components, for example by way of illustration only, be equipped with corresponding companion parts of the hinge joining structure in order that the various aircraft components are interchangeably connectible. Referring to FIG. 11 as an illustration of relating the parts, the extreme edge of the wing tip 81 is channeled at 82, as best seen in FIG. 12. There is an opening 83 in this channel that enters into a cylindrical member 84 disposed at an angle forward toward the leading edge of the wing providing a socket, the leading edge being indicated by the arrow showing the direction of wing travel. There is a slot 85 in the wall of the cylindrical member 84 through which a pawl 86 of a lever 87 extends. The lever 87 is hinged at 88 to the cylindrical member 84 and is biased to resiliently maintain the pawl 86 within the cylindrical member opening 85 by a spring 89. The lever 87 may be rotated to pull the pawl 86 out of the cylindrical member opening by a rod or cable means 90 connecting manual control means in the cockpit (not shown). The cylindrical member 84 is secured to the wing spars or ribs by bolts 91.

On the companion wing tip 100, or left wing tip of each aircraft component, to be connected to the wing tip 81, is a shaft 101 that projects outwardly through an opening 102 of the wing tip 100 in a forward direction at an angle corresponding to the angle of the cylindrical member 84 in wing tip 81 with respect to the extreme edge of the wing tips. The shaft 101 may be made retractable, where desirable, by any well known mechanical or hydraulic means. The extreme edge 103 of the wing tip 100 is convex to interfit with the channel 82, both surfaces of which are cylindrical to permit radial relative rotative movement. The shaft 101 is supported within the wing tip 100 by a bearing shaft 104 projected through shaft 101 and secured thereto by pins 105 and having its ends supported in bearings 106 which bearings are secured to the wing rib or spars of the wing tip. The axis of the bearing shaft 104 lies on the center of curvature of the extreme edge 103. The bearing shaft 104 is reduced in diameter at the bearing portions 107 and the bearings 106 have a portion 108 interfitting this reduced diameter portion of the bearing shaft 104 to eliminate end play of the shaft yet allowing free rotation. The shaft 101 has a notch 109 that is positioned to be caught by the pawl 86 when the shaft is positioned within the cylindrical member 84 and the edges 103 and 82 are contiguous. Where desirable for strength or for long wing tips, the number of the shafts 101 and cylindrical members 84 may be increased.

The wing tip 100 has a trailing edge flap 115 pivoted thereto at 116 in the well known manner and is provided with an actuating horn 117. The shaft 101 has an eyelet 118 formed or secured to the inner end thereof which eyelet is connected by a rod 119 (best seen in FIG. 13) to the free end of the horn 117. It may be seen from this structure that any angulation of the wing tips with respect to each other will rotate the shaft 101 about the axis through it formed by the bearing shaft 104 to pitch the shaft end with the eyelet 118 thereon up or down transmitting a rotary motion to the flap 115 on its pivots 116. Where a pair of aircraft are connected as in FIG. 1 and the wings assume an attitude as shown in FIG. 2 or a positive dihedral angle, the flap 115 is deflected upwardly for the purpose of elevating the hinge joint and bringing the wings back into alignment. This structure of operating the flap is adaptable to the composite aircraft arrangement shown and described for FIGS. 6, 7 and 8. In the composite aircraft arrangement illustrated for FIGS. 1 to 5, the control flap operation should be reversed from that shown in FIGS. 11, 12 and 13 for the reasons noted with respect to the description of FIGS. 6, 7 and 8 by incorporating an idler lever, such as illustrated in FIG. 14 in which the idler lever 70' similar to the idler lever 70 of FIG. 10 is inserted in the flap actuating linkage between lever 118 and rod 119 so as to effect downward flap deflection for a positive change in dihedral angle and vice versa. The flap 115 may also be connected to other flaps on the opposite wing of the aircraft component, where desirable. In practice, only one trailing edge flap, as 115, is needed to correct wing alignment since these flaps are not operative when the aircraft components are flying separately. These flaps may also be coupled such that they may be used as part ailerons during individual flight of the aircraft component.

In order that the trailing edge flap 115 does not interfere with the control of the aircraft for individual flight and in the absence of any coupling for operation with the ailerons, the inner end of the shaft 101 has an eyelet or stud means 120 in which one end of two springs 121 and 122 are fastened. The springs are directed in substantially opposite directions with the opposite end of each fastened to the wing structure. The springs bias the shaft 101, and consequently the flap 115, to a central or neutral position in which the flap is in contour alignment with the wing. The springs 121 and 122 also serve to hold the outer end of the shaft 101 in a straight outward position to enable pilots of composite aircraft of the class described to couple their aircraft in flight with ease, presently to be described.

In operation, let it be assumed that two airplanes are being piloted that are equipped with wing tip couplings as herein above described. Let it be further assumed that the two planes are flying separately and are about to join. FIG. 11 shows the two wing tips where the pilot on the right has brought his wing tip in close range to the wing tip of the left pilot such that the shaft 101 has found the channel 82 (see FIG. 12) and is sliding forwardly therealong where it is just ready to drop into the socket formed by the cylindrical member 84. When the shaft 101 slips into the cylindrical member 84 the pawl 86 will ride over the surface of the shaft until it drops into the notched portion 109 locking the two airplanes together in spanwise pivotal relation. Any slight up or down relative movement of the wing tips during wing coupling will be permitted by the springs 121 and 122 until interfitting relation of the cylindrical member 84 and the shaft 101 is accomplished. The airplanes will then fly as shown in FIG. 1. However, the trailing edge flap will have to be adapted for such operation as shown in FIG. 1 by using an idler lever in the shaft 101 to flap 115 linkage as formerly described. Where the two airplanes are connected for operation as illustrated in FIG. 6, the flap control structure shown in FIG. 11 is correct. Whenever disconnection is desired, the pilot in the left plane operates the manual means (not shown) in his cockpit to pull the rod or cable 90 dislodging the pawl 86 from the catch 109. A slight acceleration of the left airplane—or deceleration of the right airplane—will effect a separation of the two airplanes.

While the means for controlling the trailing edge flap has been shown and described as being purely mechanical, it should be fairly obvious to one skilled in the art that electro-mechanical means or other means, which may include manual means, may be employed. That is, for some types of aircraft where control motors or ailerons and flaps are electrical, it may be expedient to use an electric motor to control the trailing edge flaps by allowing the arms 53 and 54 of FIGS. 9 and 10 or the shaft 101 of FIG. 11 to operate a potentiometer or rheostat in the motor control circuit. In electrical control systems for the trailing edge flaps, it may be further advisable to use gyros to give electrical command signals to the motor control circuit.

Although the landing gear is not shown or described for the connected aircraft components of this invention, it is to be understood that landing gear, or landing dollies, may be employed on the floating airfoils, gliders, guided missiles, or the like, used in the combination of aircraft where the principal aircraft components can not support the attached wing sections or subordinate aircraft components in the air during stands, take-offs and landings. Since landing gear and landing gear control construction are well known and understood by mechanics skilled in the art and since the present invention does not disturb the use, position, or operation of landing gear or aircraft now in use and adapted for wing spanwise connection in accordance with this invention, the structural details of aircraft landing gear has not been included.

It is to be understood that many modifications and changes in structural details and features may be made without departing from the spirit and scope of this invention and I desire to be limited only by the scope of the appended claims.

I claim:

1. A high aspect ratio wing construction for aircraft to attain a maximum load carrying ability with minimum structural weight comprising at least two abutting spanwise extending wing panels each adapted to carry a substantial portion of the disposable load of the aircraft, a pivotal connection between said wing panels permitting a free relative dihedral angular movement between said panels about a chordwise extending axis from a predetermined dihedral angular alignment, control surface means on at least one of said wing panels for varying the lift thereof, and means operatively associated with said wing panels and said control surface means for actuating said control surface means in response to variation in dihedral angular relation of said wing panels to maintain a said predetermined dihedral angular alignment between said abutting wing panels.

2. A pivotal wing type coupling for selectively connecting and disconnecting the wing tips of aircraft during flight comprising the corresponding wing tip of each aircraft cylindrically contoured convexly having the center of curvature lying substantially parallel to the longitudinal center line of the aircraft, the other wing tip of each aircraft cylindrically contoured concavely to interfit the cylindrically contoured convex wing tip for spanwise lateral relative rotation; a shaft extending through an opening in the convex surface of the cylindrically contoured convex wing tip at an angle disposed forwardly toward the leading edge of said last mentioned wing tip into a socket positioned along the concave surface of said other wing tip disposed inwardly at an angle corresponding to the angle of said shaft, a notch in said shaft lying within said socket; a releasable latch in said socket operable to hold said shaft in said socket; bearing means in said cylindrically contoured convex wing tip rotatively supporting said shaft on an axis lying on the center of curvature of said convex wing tip portion; a flap on the trailing edge of said cylindrically contoured convex wing tip, said flap having an actuating horn connected by link means to the end of said shaft to be deflected in accordance with the dihedral angles assumed by said wing tips to influence said wing tips to maintain spanwise alignment; and means for maintaining flap contour alignment with said wing tip when said wing tips are disjoined.

3. A high aspect ratio wing construction for aircraft to attain a maximum load carrying ability with minimum structural weight comprising at least two abutting spanwise extending wing panels each adapted to carry a substantial portion of the disposable load of the aircraft, a pivotal connection between said wing panels permitting a free relative dihedral angular movement between said panels about a chordwise extending axis from a predetermined dihedral angular alignment, aerodynamic control means carried by at least one of said panels for varying the lift thereof to oppose relative rotation of said wing panels about the pivotal connection therebetween, and means operatively associated with said wing panels and said aerodynamic control means and responsive to a variation in the dihedral angular relation of said wing panels from said predetermined relation for actuating said aerodynamic control means in a sense to restore said wing panels to substantially the said predetermined dihedral angular alignment.

4. A high aspect ratio wing construction for aircraft to attain a maximum load carrying ability with minimum structural weight comprising at least two abutting spanwise extending wing panels each adapted to carry a substantial portion of the disposable load of the aircraft, a pivotal connection between said wing panels permitting a free relative dihedral angular movement between said panels about a chordwise extending axis from a predetermined dihedral angular alignment, an aerodynamic control surface on at least one of said wing panels for varying a lift thereof to oppose relative rotation of said wing panels about the pivotal connection therebetween, actuating means operatively associated with said wing panels and responsive to the variations in the dihedral angular relation of said wing panels from a predetermined relation being operatively connected to said control surface for actuating said control surface in accordance with the variations in the dihedral angular relation in a sense to restore said wing panels to substantially the said predetermined dihedral angular alignment.

5. A high aspect ratio wing construction for aircraft to attain a maximum load carrying ability with minimum structural weight comprising at least two abutting spanwise extending wing panels each adapted to carry a substantial portion of the disposable load of the aircraft, a pivotal connection between said wing panels permitting a free relative dihedral angular movement between said panels about a chordwise extending axis from a predetermined dihedral angular alignment, aerodynamic control surface means carried by at least one of said wing panels for varying the lift thereof to oppose relative dihedral angular displacement of said wing panels, and control mechanism interconnecting the other of said wing panels and said aerodynamic control means for actuating said aerodynamic control means in a sense to restore said wing panels to substantially said pretedermined dihedral angular alignment.

6. A high aspect ratio wing construction for aircraft as set forth in claim 5 wherein the aerodynamic control as set forth in claim 5 wherein the aerodynamic control means constitutes a trailing edge flap and the control mechanism interconnecting the other of said wing panels and the aerodynamic control means includes a rigid member extending from said other wing panel and linkage interconnecting the end of said rigid member to said flap whereby relative angular displacement between said wing panels causes said rigid member to actuate said flap to cause said flap to vary the effective camber of said one wing panel to thereby vary the lift thereon.

7. The structure as claim in 5, in which said aerodynamic control surface means comprises at least a pair of trailing edge flaps each mounted on a respective one of said wing panels adjacent the axis of the pivotal connection thereof, the control mechanism for each flap being connected for actuation by the wing panel other than the panel on which the respective flap is mounted, a positive dihedral angular displacement of said wing panels causing a downward displacement of seaid flaps and a negative dihedral angular displacement of said flaps causing an upward displacement of said flaps to effect a spanwise alignment of said wing panels upon a displacement of said panels therefrom.

8. A high aspect ratio wing construction as set forth in claim 5 wherein said pivotal connection between said wing panels is separable to allow connection and disconnection of the wing panels during flight of the aircraft, said separable connection comprising a forwardly and outwardly disposed shaft pivotally mounted between its ends in the tip of said one wing panel on a chordwise axis and extending into a forwardly and inwardly extending socket in the tip of said other wing panel, the shaft and socket having releasable latching means thereon for releasably retaining said shaft in said socket, and said aerodynamic control means is a trailing edge flap having an actuating horn and said means connected from the other of said wing panels is a rod connecting the inner free end of said shaft in said one wing panel to said flap actuating horn to produce upward flap deflection for positive changes in the dihedral angle between said wing panels, and vice versa.

9. A high aspect ratio wing construction as set forth in claim 5 wherein said pivotal connection between said wing panels is separable to allow connection and disconnection of the wing panels during flight of the aircraft, said separable connection comprising a forwardly and outwardly disposed shaft pivotally mounted between its ends in the tip of said one wing panel on a chordwise axis and extending into a forwardly and inwardly extending socket in the tip of said other wing panel, the shaft and socket having releasable latching means thereon for releasably retaining said shaft in said socket, and said aerodynamic control means is a trailing edge flap having an actuating horn and said means connected from the other of said wing panels is a rod connecting the inner free end of said shaft in said one wing panel to one end of a centrally pivoted lever, the other end of said ceentrally pivoted lever being connected by a rod to said flap actuating horn whereby positive changes in the dihedral angle between said wing panels produce downward flap deflections, and vice versa.

10. A high aspect ratio wing construction as set forth in claim 1 wherein the pivotal connection between said wing panels includes a hinge mechanism supported on one of said wing panels and having a rigid coupling element extending beyond the hinge axis and a complementary coupling element mounted on the other of said wing panels for engagement with said first-named coupling element in flight to thereby rigidly pivotably interconnect said wing panels and means mounted on one of said wing panels and actutable at will for disconnecting said coupling elements in flight.

11. A high aspect wing construction for aircraft comprising a central wing panel and a pair of outboard wing panels each of the outboard panels abutting the central panel and pivotally connected thereto about an axis substantially parallel to the chord of the main wing and capable of unrestrained flapping movement about the pivotal connection, each outboard panel being adapted to carry a substantial part of the total air load on the wing assembly, each outboard wing panel having at least one flap mounted thereon and displaceable in either of two directions from a neutral position to increase or decrease the lift thereof, control means for actuating the flaps connected to said flaps and the main wing and operative upon a dihedral angular displacement of an outboard wing panel about its pivotal axis from a predetermined spanwise alignment with the main wing to actuate the corresponding flap to vary the lift on the outboard wing panel to restore the same to substantially the initial predetermined alignment with the main wing.

12. A composite aircraft of high aspect ratio comprising a pair of substantially identical aircraft each having a supporting wing, a hinge joint connecting said wings in the plane of symmetry for free dihedral angular movement, a flap on each wing adjacent the hinged connection for varying the lift on the respective wings to bring the same into substantial spanwise alignment upon displacement therefrom and means operatively associated with said wings and connected to said flaps for operating said flaps in response to dihedral angular displacement of said wings in either direction from said substantial spanwise alignment.

13. The structure as claimed in claim 12 in which the hinge joint connecting said wings includes means for connecting and disconnecting the wings of the component aircraft from each other during flight.

14. A composite aircraft of high aspect ratio comprising a large central aircraft provided with a supporting wing, a pair of companion aircraft each having a supporting wing connected to a respective tip of the central aircraft wing by a hinge joint substantially parallel to the chord thereof and permitting free dihedral angular displacement of the companion aircraft wing with respect to the central aircraft wing during flight, said wings being normally in substantial alignment and the companion aircraft wings carrying a loading per unit of area substantially equal or greater than the central aircraft wing, control flaps on each of said companion aircraft wings, actuating means for said flaps operatively associated with the central aircraft wing and each companion aircraft wing and responsive to dihedral angular variation of said companion aircraft wings with respect to said central aircraft wing to vary the lift on the companion aircraft wings to restore the same to the normal spanwise alignment after a displacement of either of said companion aircraft wings therefrom.

15. The structure as claimed in claim 14, in which the connection between the wings of the companion aircraft and the wing of the central aircraft includes means operable to connect and disconnect the companion aircraft during flight.

16. A multiple aircraft comprising a plurality of winged aircraft each separately powered and capable of independent flight, said aircraft attachably and releasably connected to one another in flight in a wing tip to wing tip arrangement, the juncture at the wing tips being clean aerodynamically whereby aerodynamic upwash from the connected wing tips mutually support one another, said aircraft being pivotally connected at the wing tips to permit the individual aircraft to assume different angles.

17. Coupling means for interconnecting a plurality of airplanes by their wing tips during flight for unified flight, said coupling means comprising means carried at the wing tip of each airplane and organized and arranged for interlocking engagement during flight, and means carried by one of said wing tips and connected with the control surfaces of that wing and to the interlocking means whereby rolling movements of either of said airplanes operate the control surfaces to counteract such rolling movement.

References Cited by the Examiner
UNITED STATES PATENTS

| | | | |
|---|---|---|---|
| 1,600,671 | 9/26 | Hill | 244—45 |
| 2,105,307 | 1/38 | Ackerman | 244—135 X |
| 2,406,588 | 8/46 | Cornelius | 244—13 |

FOREIGN PATENTS

| | | |
|---|---|---|
| 297,992 | 6/32 | Italy. |
| 600,477 | 4/48 | Great Britain. |

FERGUS S. MIDDLETON, *Primary Examiner.*

MILTON L. MARLAND, ARTHUR M. HORTON,
*Examiners.*